United States Patent [19]

McCray et al.

[11] 4,263,716
[45] Apr. 28, 1981

[54] INSTRUMENT FOR MEASURING THE LOCATION AND ORIENTATION OF VALUE PORTS

[75] Inventors: Richard L. McCray, Corry, Pa.; Wayne J. Lampi, Mount Vernon; William T. Crawford, Danville, both of Ohio

[73] Assignee: Cooper Industries, Inc., Houston, Tex.

[21] Appl. No.: 23,023

[22] Filed: Mar. 22, 1979

[51] Int. Cl.³ .............................................. G01B 5/24
[52] U.S. Cl. ................................. 33/174 Q; 33/178 R
[58] Field of Search ............... 33/1 N, 174 R, 174 E, 33/174 J, 174 Q, 178 R, 180 R, 181 R, 189

[56] References Cited

U.S. PATENT DOCUMENTS

| | | | |
|---|---|---|---|
| 2,616,184 | 11/1952 | Mendro et al. | 33/181 AT |
| 3,217,418 | 11/1965 | Wennerberg | 33/174 Q |
| 3,279,079 | 10/1966 | Schiler | 33/169 R |
| 3,939,569 | 2/1976 | Squires | 33/174 Q |
| 3,944,798 | 3/1976 | Eaton | 33/1 N |

FOREIGN PATENT DOCUMENTS 167640  1/1965  U.S.S.R. ............................. 33/174 Q

Primary Examiner—Richard R. Stearns
Attorney, Agent, or Firm—Wilson, Fraser, Barker & Clemens

[57] ABSTRACT

An instrument is disclosed for measuring the location and orientation of a port in a casting and particularly of a plurality of ports spaced around a tubular cast compressor body. References representing desired locations for the port are established either in an adapter which engages the casting or in a support for the casting. Adjustable brackets interconnect a port locater and the reference means. The brackets include scales for indicating the location and orientation of each of the ports.

4 Claims, 11 Drawing Figures

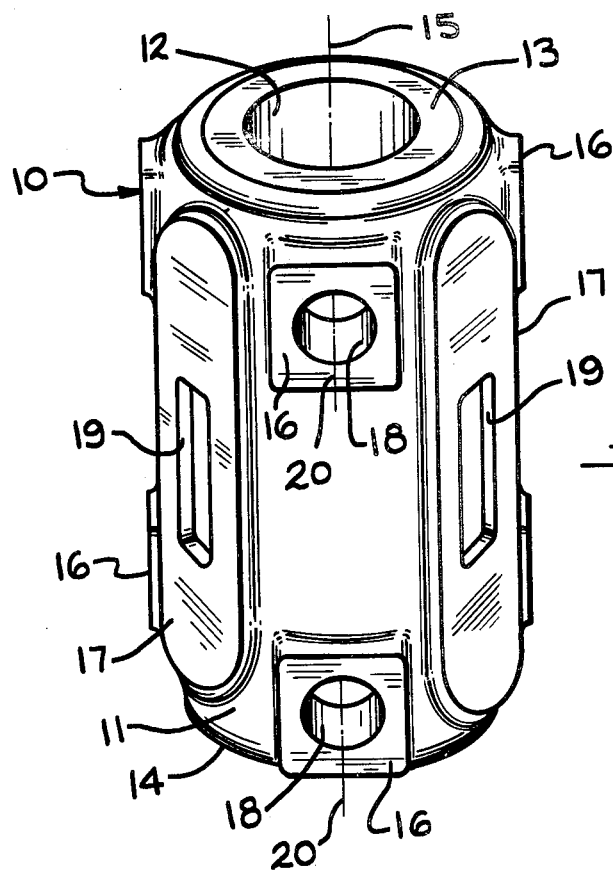
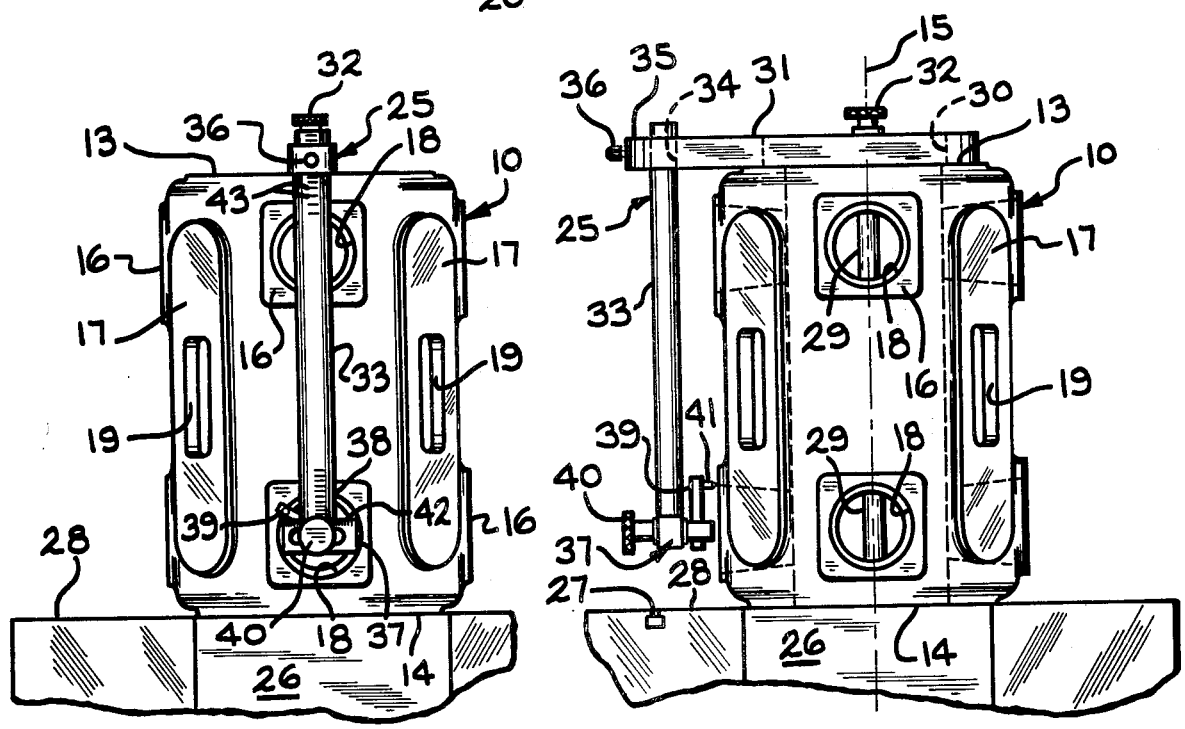
FIG. 1
FIG. 2
FIG. 3

INSTRUMENT FOR MEASURING THE LOCATION AND ORIENTATION OF VALUE PORTS

BACKGROUND OF THE INVENTION

This invention relates to geometrical instruments and particularly to an instrument for measuring the location and orientation of openings in a casting and particularly of a plurality of ports spaced around a tubular cast compressor body to determine any shift or deviation in each port from a nominal port location.

Large scale industrial compressors are commonly constructed with a generally tubular shaped body defining a cylinder in which a piston reciprocates. The tubular compressor body may form a cylinder as much as two feet or more in diameter and may have an axial dimension several feet in length to provide an extremely large displacement for the reciprocating piston. The walls of the compressor body are several inches thick and are provided with a plurality of ports which may be spaced both axially and circumferentially thereabout for mounting intake and exhaust valves.

The compressor body is initially cast from metal in a mold having cores forming the main cylinder in which the piston reciprocates and forming the various ports in which the intake and exhaust valves are mounted. The ports are smaller than the final port openings to permit machining these openings to precise dimensions. Nowadays, the final machining is commonly accomplished on an automatic machine tool which is under the control of a computer. The computer is programmed to automatically control the machine tool for each machining phase at each valve port, which includes milling, rough boring, finishing and drilling bolt holes for attachment of exterior manifolding. Passages are also provided within the compressor body for circulation of a coolant. In order to achieve a maximum and uniform cooling, only a limited amount of metal stock is allowed in the walls of each valve port. Normal manufacturing tolerances and also non-uniform cooling of the cast compressor body can cause the valve ports to shift from their desired or nominal location during the casting process. The shifting may take several forms. For example, the entire port may shift by a small angular amount about the axis of the compressor body or it may shift in an axial direction. Or, the port at either or both the interior or exterior surface of the compressor body may shift by different amounts or in different directions so that the axis of the cast port is skewed and out of alignment with the axis of the main cylinder in which the compressor piston reciprocates. Since only a limited amount of metal stock is allowed in the walls of each valve port, a defective compressor body may be produced if the valve port is machined at its nominal location without taking into account the shift or deviation of the port from the nominal location during the casting process. Therefore, it is desirable to measure the orientation and location of each port in a cast compressor body and to supply this data to the computer controlled machine tool to insure optimal symmetry for equal stock distribution about the walls of each valve port or pocket after machining.

SUMMARY OF THE INVENTION

According to the present invention, an instrument is provided for measuring the location and orientation of a plurality of ports spaced around a tubular cast compressor body, or similar casting. The instrument is particularly suitable for measuring the deviation of valve ports from desired or nominal port locations. The measurements are then supplied to a computer which controls a machine tool for milling, rough boring and finishing the valve ports at optimum locations in the compressor body to maximize the uniformity of stock or metal distribution about the valve ports. The compressor body is positioned on a supporting surface, which preferably comprises a shuttle pallet which also orients and supports the compressor body during machining. The compressor body is oriented such that the central axis of the main piston cylinder extends vertically from a predetermined point on the shuttle pallet. In one embodiment, slots are accurately formed in the upper surface of the shuttle pallet to radiate outwardly from this point. The slots are angularly oriented to conform with a desired angular location for the ports about the cylinder axis. The compressor body is oriented on the shuttle pallet so that each port is associated with and substantially above one of the slots. The instrument of the present invention is then positioned in a slot for measuring the deviation of one or more ports associated with such slot from the desired location for such ports. After the ports associated with a slot are located, the instrument is moved to the next slot for measuring the deviation of the port or ports associated with that slot from their desired location and the procedure is repeated until all port locations are accurately measured.

The instrument includes an adjustable port locater mounted on a bracket which engages the pallet. The locater, which is adjusted into alignment with a port, may comprise an optical sight, a transparent disk having marks or circles inscribed thereon, a rotatable scribe, a plug which engages the port opening, or a similar type device. Suitable scales are provided between the adjustable locater and the bracket which engages the pallet for indicating the height of the port opening above the upper surface of the shuttle pallet and the horizontal deviation of the port from the desired port location. If desired, marks may be scribed on the shutter pallet adjacent each of the slots for indicating the radial spacing of each port at the outer surface of the compressor body from the central compressor body axis. After measurements are taken for the location of each port, these measurements are supplied to the machine tool control computer and the compressor body is transferred on the shuttle pallet to the machine tool for finishing the individual ports. During the machining operation, an operator may measure the location and orientation of the ports in another compressor body located on another shuttle pallet so that at the end of the machining operation, the next compressor body may be transferred to the machine tool for finishing.

In a modified embodiment of the instrument, the reference slots may be omitted from the shuttle pallet. The compressor body is positioned on the shuttle pallet, again with its central axis in alignment with a predetermined point on the pallet. A rod or bracket is attached to the pallet at this predetermined point to extend perpendicular from the pallet and concentric with the compressor body axis. An arm is mounted on the rod to extend radially therefrom against an upper end of the compressor body. A suitable scale is attached to the rod for indicating the angular orientation of this arm. In addition, the vertical rod and the arm may be interconnected through a slot in the arm which permits adjustment of the length of the arm. A scale is provided for indicating the length of the arm to in turn indicate the radial distance of the outer surface of the compressor body at each port from the central axis of the compressor body. A vertically adjustable rod is mounted on the outer end of the radial arm. An adjustable locater is mounted at the lower end of the vertical rod. The rod is adjusted vertically and the locater is adjusted horizontally until the locater is in alignment with a port. Scales are provided on the vertical rod and on the horizontal adjustment for the locater to indicate the precise location of the port.

In each of the above described embodiments, the adjustable locater may include an angular adjustment which indicates any angular deviation of the port axis from the central axis of the compressor body. Or, the locater may be adjusted for measuring the location of the port at the outer surface of the compressor body and, subsequently, readjusted for measuring the location of the port at the inner surface of the compressor body. If the locations are not identical, the port is skewed so that its axis does not pass perpendicular to and through the central axis of the compressor body. A chart may be established for determining the best location for the finish port in the compressor body from the measurements of the inner and outer surface locations for the port, or the best location may be determined by suitable programming in the computer which controls the machine tool for finishing the ports.

Accordingly, it is an object of the invention to provide an instrument for measuring the location of openings in a casting.

Another object of the invention is to provide an instrument for measuring the location and orientation of a plurality of ports spaced around a tubular cast compressor body.

Other objects and advantages of the invention will become apparent from the following detailed description, with reference being made to the accompanying drawings.

BRIEF DESCRIPTION OF THE DRAWINGS

FIG. 1 is a perspective view showing a typical tubular cast compressor body having a plurality of ports formed therein;

FIG. 2 is a side elevational view of an instrument in accordance with one embodiment of the invention for measuring the location and orientation of ports in a tubular cast compressor body;

FIG. 3 is a front elevational view of the instrument of FIG. 2;

DESCRIPTION OF THE PREFERRED EMBODIMENTS

Figure 4:
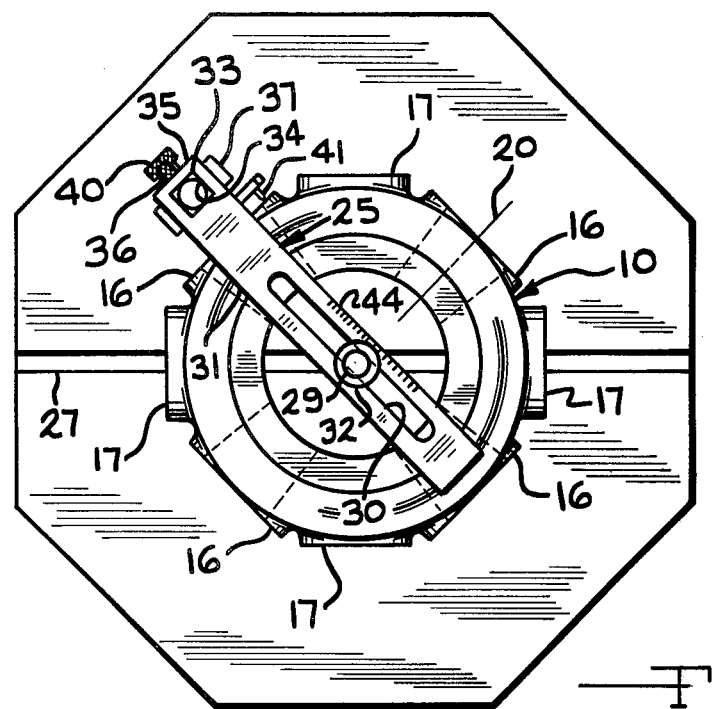
FIG. 4 is a top plan view of the instrument of FIG. 2.

Turning now to the drawings and particularly to FIG. 1, a typical cast compressor body 10 is illustrated. The compressor body 10 is generally tubular in shape, having an outer wall 11, an inner wall 12 and two ends 13 and 14. The inner wall 12 defines a cylinder having an axis 15. When the compressor is completed, a reciprocating piston fits within the cylinder defined by the inner wall 12. In the illustrated compressor body 10, the outer wall 11 is shaped to define four faces 16 and four faces 17 which alternate between the faces 16. Two ports or pockets 18 are formed to extend from each face 16 through the compressor body 10 to the inner wall 12 for receiving inlet and outlet valves (not shown). A single port 19 is formed in each of the faces 17. The ports 19 connect with passages in the compressor body 10 through which a coolant is circulated.

During casting, cores are inserted into a cavity for forming the valve ports or pockets 18. After casting, each valve port 18 is machined and finished. Also, a circle of holes is drilled and tapped into the casting face 16 about each port 18 for attachment of manifolding. Under ideal conditions, each port 18 is formed during the casting operation with an axis 20 which is perpendicular to and intersects the central axis 15 through the compressor body 10. However, core shift during the casting operation can cause the axis 20 for one or more of the ports 18 to shift or skew with respect to the axis 15. Or, the core shift may cause the port 18 to shift vertically or horizontally from a desired location. Accordingly, the instrument of the present invention is designed for measuring the shift or deviation of each port 18 from a desired location for such port and for measuring the degree of skew of the axis 20 for each port 18 caused by core shift during the casting process. These measurements are logged and supplied to an automatic machine tool so that the valve ports are machined at an optimal location.

Turning now to FIGS. 2-4, one embodiment is illustrated of an instrument 25 constructed in accordance with the present invention for measuring the location of the ports 18 in the compressor body 10. The compressor body 10 is positioned on a flat supporting surface, such as a shuttle pallet 26. The instrument 25 cooperates with the shuttle pallet 26 while the orientation and location of the ports 18 are measured. Subsequent to the measurement, the compressor body 10 is transferred on the shuttle pallet 26 to a station where milling, rough boring and finishing operations are performed. A keyslot 27 is formed in an upper surface 28 of the pallet 26 for mounting the instrument 25. The instrument 25 includes a rod or bracket 29 which is mounted in the keyslot 27 to extend vertically from the upper pallet surface 28. The compressor body 10 is positioned on the pallet 26 and the bracket 29 is located in the keyslot 27 such that the bracket 29 is concentric with the compressor body axis 15. An upper end of the bracket 29 extends through a slot 30 in an arm 31. The arm 31 abuts the upper end 13 of the compressor body 10 and is held in place by a knurled nut 32 which threadably engages the bracket 29. The bracket 29 is provided with a square end which closely engages the slot 30 in the arm 31. The bracket 29 is retained within the keyslot 27 in the pallet 26 such that the arm 31 is retained in one of four selective positions which are 90° apart. In each of the different positions, the arm 31 will extend perpendicular to a different one of the four faces 16 on the compressor body 10. Or, an angular scale or protractor is mounted on the bracket 29 for indicating the angular orientation of the arm 31 so that the arm 31 can be positioned accurately with respect to the compressor body faces 16.

A vertically adjustable rod 33 extends through an opening 34 in an end 35 of the arm 31. The rod 33 is retained within the opening 34 by a screw 36 which threadably engages the arm 31. The rod 33 is raised or lowered to a desired position in alignment with a port 18 while the screw 36 is loosened and is retained in this position by tightening the screw 36. An adjustable port locater 37 is located on a lower end 38 of the rod 33. The locater 37 includes a pointer or scribe 41 mounted on an arm 39 which is rotated by means of a knob 40. The arm 39 is adjusted so that when it is rotated, the scribe 41 describes a circle having the same diameter as the port 18. The scribe 37 is horizontally adjustable on the lower end 38 of the rod 33 and is vertically adjustable through adjustment of the position of the rod 33 on the arm 31. The position of the scribe 41 is adjusted such that when an operator rotates the knob 40, the pointer 41 describes a circle which is coincident with the adjacent port 18 under measurement. When so adjusted, a scale 42 on the adjustable scribe 37 indicates a horizontal position of the port 18 with respect to the position of the arm 31, a scale 43 on the rod 33 indicates the vertical spacing of the port 18 from the upper end 13 of the compressor body 10 and a scale 44 on the arm 31 indicates the radial distance from the compressor body axis 15 to the port 18 at the compressor body face 16. Through the measurements indicated on the scales 42, 43 and 44, each of the ports 18 is accurately located. These measurements locating each of the ports 18 are supplied to a machine tool for automatically finishing the ports 18 at optimal locations on the compressor body 10.

Figure 5:
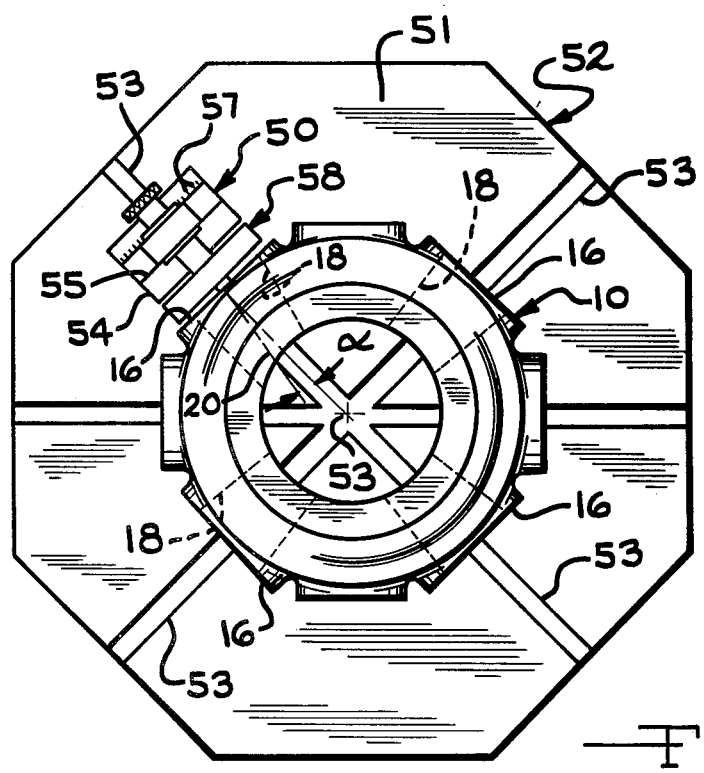
FIG. 5 is a top plan view of a modified embodiment of an instrument for measuring the location and orientation of a plurality of ports spaced around a tubular cast compressor body.
Figure 6:
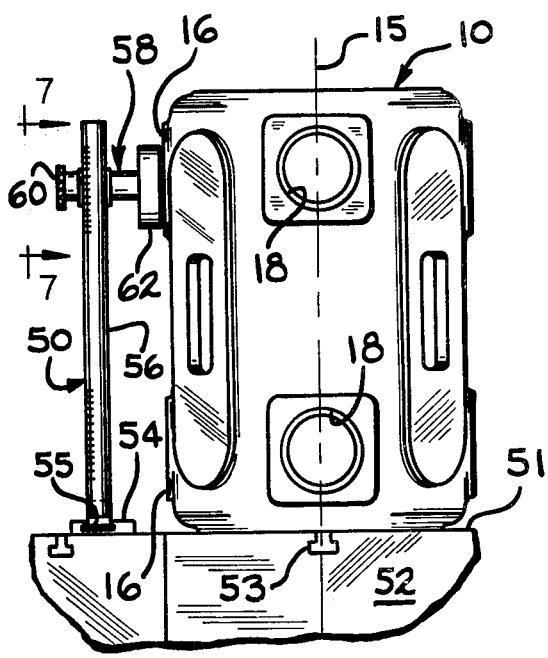
FIG. 6 is a side elevational view of the instrument of FIG. 5.
Figure 7:
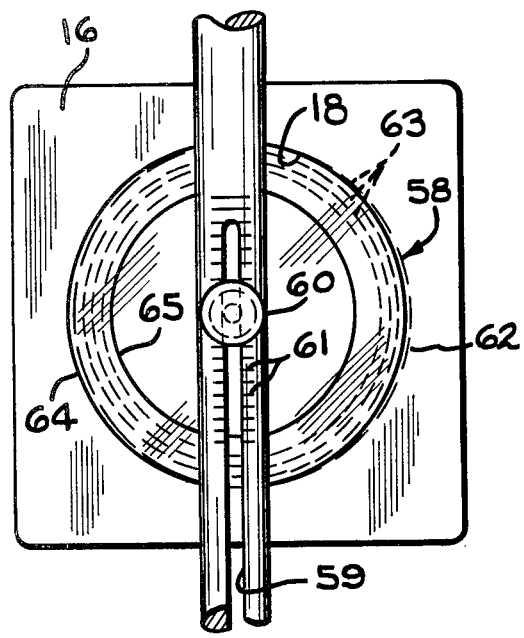
FIG. 7 is a fragmentary front view of a portion of the instrument of FIG. 5.

Turning now to FIGS. 5–7, a modified embodiment is illustrated of an instrument 50 for measuring the location and orientation of a plurality of ports in a casting, and particularly in the cast compressor body 10. The compressor body 10 is placed upon a flat supporting surface such as an upper surface 51 of a shuttle pallet 52. The location and orientation of the ports 18 in the compressor body 10 are measured while the body is on the shuttle pallet 52 and, then, the shuttle pallet 52 is used to transfer the compressor body 10 to an automatic milling, boring, drilling machine which finishes the port 18. The compressor body 10 is oriented on the pallet 52 such that its axis 15 passes through a point 53 at the center of the pallet 52. Keyslots 53 are accurately machined into the upper surface 51 of the pallet 52 to form references for desired angular locations of the ports 18 about the compressor body axis 53. The instrument 50 selectively engages the different keyslots 53 for measuring the location and orientation of the different ports 18. In the illustrated compressor body 10, two ports 18 are spaced vertically above each of the keyslots 53. For a perfect casting, the two ports 18 associated with each of the keyslots will be located in exact vertical alignment with such keyslot 53 and each of the ports 18 will have a central axis which intersects and is perpendicular to the central axis 15 for the compressor body 10. As illustrated in FIG. 5, the port 18 adjacent the instrument 50 is slightly skewed due to a shift in the core which formed this port 18 during the casting process. The axis 20 for the port 18 is illustrated as being skewed by an angle α so that the axis 20 for the port 18 does not extend through the main compressor body axis 15.

The instrument 50 includes a base bracket 54 which engages the keyslots 53 for movement toward and away from the compressor body 10 substantially perpendicular to the faces 16. The base bracket 54 has a slot 55 which extends in a direction perpendicular to the adjacent keyslot 53 and parallel to an adjacent face 16 on the compressor body 10. A rod 56 slidably engages the slot 55 so as to be held in a position vertical to the surface 51 of the pallet 52. The rod 56 is allowed to slide in the slot 55 in a path parallel to the adjacent faces 16 on the compressor body 10, while being held vertical. A suitable scale 57 is inscribed on the base bracket 54 to indicate the position of the rod 56 with respect to the pallet keyslot 53 in which the base bracket 54 is mounted. A locater 58 is mounted in a slot 59 which extends vertically up the rod 56. The locater 58 is moved to a desired location in the slot 59 and is then locked in place by means of a knurled nut 60. Or, the locater 58 can be held in the slot 59 by friction and merely moved by exerting a force on the nut 60. The vertical position of the locater 58 is indicated by a scale 61 inscribed on the vertical rod 56 adjacent the slot 59. For the instrument 50, the locater 58 includes a transparent disk 62 which may be formed, for example, from plexiglass. The disk 62 has an outer diameter which corresponds to the diameter of the port 18 at the surface 16 of the compressor body 10. Smaller diameter circles 63 also may be inscribed on the disk 62.

The cores which form the ports 18 in the compressor body 10 are slightly tapered to permit removal from the compressor body 10 after casting. As a consequence, a port 18 will describe a circle 64 at the face 16 on the outer wall 11 of the compressor body 10 and will describe a smaller circle 65 at the inner wall 12 of the compressor body 10, as best illustrated in FIG. 7. If the axis of a port 18 is skewed, the circles 64 and 65 will not be concentric. The degree of skew is determined by adjusting the disk 62 first to coincide with the circle 64 at the compressor body face 16 and reading the scales 57 and 61 to determine the location of the port 18 at the face 16. Then, a circle 63 inscribed on the disk 62 having the same diameter or substantially the same diameter as the circle 65 is selected and the disk 62 is adjusted so that this circle 63 is concentric with the circle 65. The scales 57 and 61 are read to obtain a measurement of the location of the circle 65 at the inner wall 12 of the compressor body 10. The two measurements are taken for each port 18 and all of the logged data is supplied to an automatic machine tool which selects the optimal locations for finishing the ports 18 to achieve a maximum uniformity in wall thickness about each of the finished ports 18. Or, a chart may be constructed for selecting an optimal location for finishing each port 18 based upon the two measurements for the port and the diameter of the compressor body 10.

Figure 8:
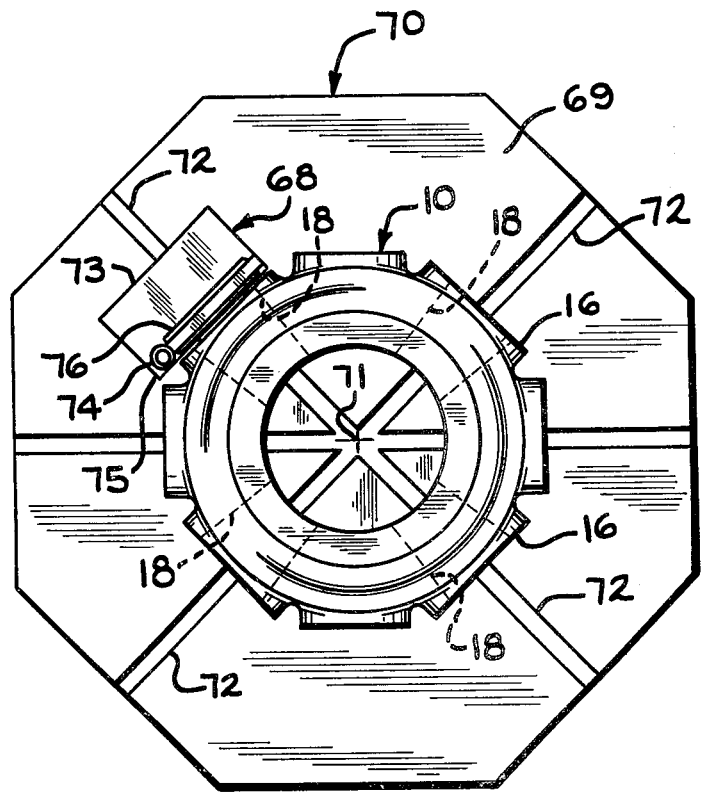
FIG. 8 is a top elevational view of still another embodiment of an instrument for measuring the location and orientation of a plurality of ports spaced around a tubular cast compressor body.
Figures 9, 11:
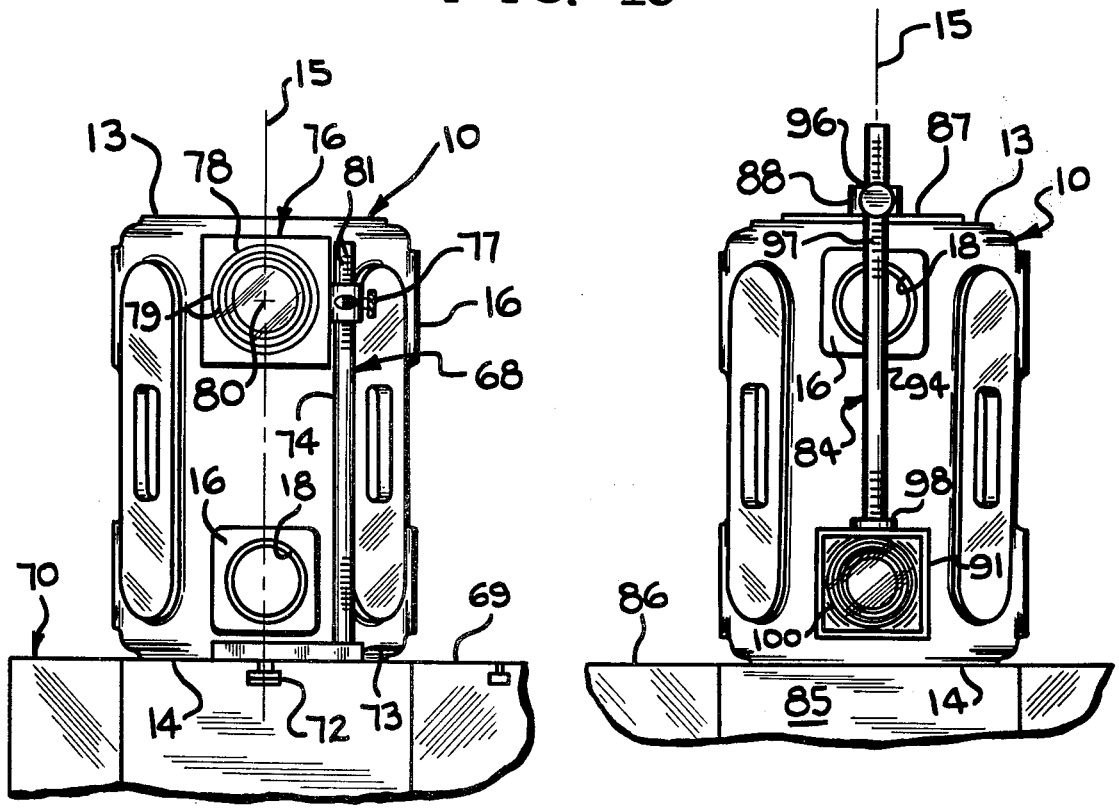
FIG. 9 is a front elevational view of the instrument of FIG. 8.
FIG. 11 is a front elevational view of the instrument of FIG. 10.

Turning now to FIGS. 8 and 9, still another embodiment of an instrument 68 is shown for measuring the location and orientation of ports in a casting, such as the cast compressor body 10. Again, the instrument 68 is mounted to extend perpendicular to an upper surface 69 of a supporting member, such as a shuttle pallet 70. The compressor body 10 is placed on the shuttle pallet 70 so as to be concentric with a central point 71. The compressor body is oriented about its central axis 15 so that the faces 16 lie in planes perpendicular to keyslots 72 formed in the pallet surface 69. The instrument 68 includes a base 73 which selectively slides into the slots 72. A rod 74 extends vertically from one corner 75 of the base 73. A locater 76 is mounted to slide in a vertical direction on the rod 74 and is held in place by a set screw 77. The locater 76 is provided with a transparent window 78 having a plurality of circles 79 inscribed thereon. The circles 79 are concentric with a point 80 in the center of the window 78 and are provided uniformly increasing diameters, such as diameters increasing by 1/16 inch increments. A vertical scale 81 is provided on the rod 74 for indicating the vertical height of the locater 76.

In operation, the instrument 76 is positioned with the base 73 located in a keyslot 72 associated with one of the ports 18. The locater 76 is then positioned on the rod 74 at a height above the pallet surface 69 at which this port 18 is supposed to be located from the compressor body end 14. An operator then visually compares the inscribed circles 79 on the locater window 78 to determine the degree of vertical and horizontal shift of both the outer and inner ends of the port 18 from the desired location concentric with the point 80 on the locater 76. Similar readings are taken for each of the ports 18 and this data is then supplied to a machine tool which automatically finishes the ports 18 at optimal locations determined from the measurements.

Figure 10:
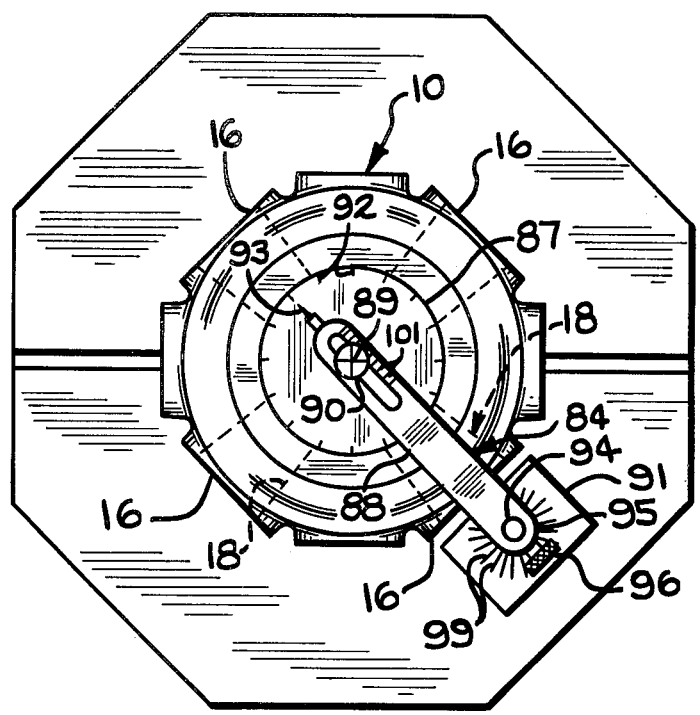
FIG. 10 is a top elevational view of still another embodiment of an instrument for measuring the location and orientation of a plurality of ports spaced around a tubular cast compressor body.

Turning now to FIGS. 10 and 11, still another embodiment is shown of an instrument 84 for measuring the location and orientation of openings or ports in a casting. Again, the instrument 84 is illustrated measuring the location and orientation of ports in the cast compressor body 10 prior to finishing the ports on an automatic machine tool. The compressor body 10 is placed on a suitable support, such as a shuttle pallet 85 which has a flat upper surface 86. The instrument 84 has a circular adapter 87 which fits into the cylindrical opening defined by the inner wall 12 of the compressor body 10 and abuts the upper end 13 of the compressor body 10. An arm 88 is attached to a center 89 of the adapter 87 by means of a nut or bolt 90. The adapter center 89 is concentric with the axis 15 through the compressor body 10. By loosening the nut 90, the arm 88 is rotated about the center 89. Also, the arm may be moved lengthwise while the nut 90 is loosened for adjusting the spacing between a port locater 91 and a face 16 on the compressor body 10. A scale 92 is inscribed about the adapter 87 for cooperating with a pointer 93 on the arm 88 to indicate the angular position of the arm 88.

A vertical rod 94 is attached to an end 95 of the arm 88 by means of a set screw or bolt 96. While the set screw 96 is loosened, the rod 94 is raised or lowered in a vertical direction and then is locked in place by tightening the set screw 96. The actual distance between the top 13 of the compressor body 10 and the center of the locater 91 is indicated by a scale 97 inscribed on the rod 94. The locater 91 is attached to a lower end 98 of the rod 94 and is adapted to rotate about the vertical axis of the rod 94. Scale markings 99 are placed on the locater 91 for indicating the rotational or angular position of the locater 91 with respect to a radius emanating from the center or axis 15 of the compressor body 10 outwardly to the locater 91. The locater 91 includes optics 100 which functions in a manner similar to a gun scope. The locater 91 is aimed so as to be in alignment with the axis of a port 18. An angle is then read from the scale 92 on the adapter 87, a second angle is read from the scale 99 on the locater 91 and a vertical distance of the port 18 from the upper end 13 of the compressor body 10 is read on the scale 97. The distance of the port 18 at the face 16 to the point 89 is indicated on a scale 101 on the arm 88. Similar measurements are then taken for each of the ports 18 on the compressor body 10 and these measurements are supplied to a machine tool control for automatically finishing the ports 18.

It will be appreciated that various modifications and changes may be made in the above-described embodiments of instruments for measuring the location and orientation of ports in a casting. For example, in addition to the different types of locations described for the above instruments, the locater can comprise a tapered plug similar to the cores used to cast the ports. The plug is adjusted to engage a port and measurements are taken for the location and orientation of the plug. The different locaters illustrated in the drawings can be interchanges, e.g., the locater 58 illustrated in FIGS. 5-7 can replace the locater 76 illustrated in FIGS. 9 and 10 or the locater 37 illustrated in FIGS. 2-4. It also will be appreciated that the instruments may be adapted for use with castings other than the illustrated compressor body. Various other modifications and changes also may be made without departing from the spirit and the scope of the following claims.

I claim:

1. An instrument for measuring the location and orientation of a plurality of ports spaced around a tubular cast compressor body having at least one end, an exterior surface and an interior surface defining a cylinder having an axis, said ports extending through said body from the exterior surface to the interior surface, said instrument comprising: body reference means for defining a desired angular location of each of said ports about said axis; means for measuring the deviation of each of said ports from the desired location for each such port defined by said reference means and in a plane perpendicular to said body axis, said means for measuring the deviation of each of said ports including means for measuring the angular deviation of each port from the reference means for such port in a plane perpendicular to said body axis, and means for measuring the distance between said body axis and each of said ports at said outer surface; and means for measuring the distance of each of said ports from said one body end.

2. An instrument for measuring the location and orientation of a plurality of ports spaced around a tubular cast compressor body, as set forth in claim 1, wherein each port has an axis and further including means for measuring any misalignment of each port axis from said body axis.

3. An instrument for measuring the location and orientation of a plurality of ports spaced around a tubular cast compressor body having at least one end, an exterior surface and an interior surface defining a cylinder having an axis, said ports extending through said body from the exterior surface to the interior surface, said instrument comprising: body reference means for defining a desired angular location of each of said ports about said axis, said reference means including means defining a flat surface for supporting said compressor body in a predetermined orientation, a plurality of slots in said supporting means surface extending radially outwardly from a point, each of said slots defining the desired angular location of one or more associated ports on said compressor body; means for measuring the deviation of each of said ports from the desired location for each such port defined by said reference means and in a plane perpendicular to said body axis, said means for measuring the deviation of each of said ports includes a bracket, mounting means on said bracket for selectively engaging the different ones of said slots for holding said brackets perpendicular to said supporting means surface, adjustable locater means mounted on said bracket for alignment with a port associated with the slot which said mounting means on said bracket engages, and means interconnecting said adjustable locater means and said bracket for indicating the deviation of such port aligned with said adjustable locater means from its desired location; and means for measuring the distance of each of said ports from said one body end.

4. An instrument for measuring the location and orientation of a plurality of ports spaced around a tubular cast compressor body, as set forth in claim 3, wherein each port has an axis and further including means for measuring any misalignment of each port axis from said body axis.

* * * * *